US006897906B2

(12) United States Patent
Stephenson

(10) Patent No.: US 6,897,906 B2
(45) **Date of Patent: *May 24, 2005**

(54) REWRITABLE LABEL FOR RECORDING TIME INFORMATION

(75) Inventor: Stanley W. Stephenson, Spencerport, NY (US)

(73) Assignee: Eastman Kodak Company, Rochester, NY (US)

(*) Notice: Subject to any disclaimer, the term of this patent is extended or adjusted under 35 U.S.C. 154(b) by 52 days.

This patent is subject to a terminal disclaimer.

(21) Appl. No.: 10/106,302

(22) Filed: Mar. 26, 2002

(65) Prior Publication Data

US 2002/0154251 A1 Oct. 24, 2002

Related U.S. Application Data

(63) Continuation-in-part of application No. 09/799,378, filed on Mar. 5, 2001, now abandoned.

(51) Int. Cl.$^{7}$ .................... G02F 1/13; C09K 19/02

(52) U.S. Cl. .................... 349/2; 349/175; 349/199

(58) Field of Search .................... 349/175, 199, 349/2, 185

(56) References Cited

U.S. PATENT DOCUMENTS

| | | | | |
|---|---|---|---|---|
| 4,435,047 A | | 3/1984 | Fergason | |
| 5,040,296 A | | 8/1991 | Yerger | |
| 5,290,066 A | | 3/1994 | Mody et al. | |
| 5,437,811 A | | 8/1995 | Doane et al. | |
| 5,727,818 A | | 3/1998 | Schmeida | |
| 6,002,383 A | * | 12/1999 | Shimada | 345/87 |
| 6,065,701 A | | 5/2000 | Tanimura et al. | |
| 6,201,587 B1 | * | 3/2001 | Sakamaki | 349/86 |
| 6,414,435 B1 | * | 7/2002 | Akiba | 313/584 |
| 6,423,368 B1 | * | 7/2002 | Stephenson et al. | 427/64 |

OTHER PUBLICATIONS

U.S. Appl. No. 09/799,220, filed Mar. 5, 2001 by Stephenson.

* cited by examiner

*Primary Examiner*—Huyen Ngo
(74) *Attorney, Agent, or Firm*—Kathleen Neuner Manne

(57) ABSTRACT

A method of recording rewritable time related information on a label, includes the steps of providing an electrically rewritable label associated with an article which includes a plurality of rewritable segments, each such segment having a layer including a material which is effective in at least first and second optical states so that the time related information can be written, rewritten and viewed, wherein such time related information relates to usage or potential usage of the article or a device associated with the article and such time related information can be electrically changed by providing appropriate electrical fields to the material, and electrically addressing selected segments to write or rewrite appropriate time related information.

28 Claims, 5 Drawing Sheets

REWRITABLE LABEL FOR RECORDING TIME INFORMATION

CROSS REFERENCE TO RELATED APPLICATIONS

This is a Continuation-in-Part of U.S. Ser. No. 09/799,378, filed Mar. 5, 2001, now abandoned, by Stanley Stephenson entitled Recording Rewritable Time Related Information on a Label.

FIELD OF THE INVENTION

The present invention relates to recording rewritable time related information on a label which can be provided on an article.

BACKGROUND OF THE INVENTION

Audio-visual (A/V) recordings, such as movies, can be stored on a variety of media. Currently, such recordings are stored on video cassette record (VCR) tapes or Digital Video Disk (DVD) optical storage disks. Such media is subject to damage and is typically stored in a storage case. Agencies have been developed to provide rental of such recordings on either type of storage media. A renter pays an agency to possess a given recording for a given time period. Agencies rent storage cassettes for variable amounts of time at different prices. Such agencies also rent computer games at a price for a given time period. Financial penalties are assessed if the media cassette is not returned by a certain return time. It would be useful to display that return time on the storage cassette to prevent late fees.

Currently, a paper receipt is typically provided as a record of the return time to a customer for a given cassette. Alternatively, an adhesive label with the return time could be applied to the case. U.S. Pat. No. 5,040,296 discloses an adhesive label for a VCR cassette having a permanent set of indicia printed and covered with a surface that permits erasable marking. An alternative method is shown in U.S. Pat. No. 5,727,818 wherein indicia formed by pressure from a pointed tip are erased by lifting the protective sheet.

An electronic label is disclosed in U.S. Pat. No. 6,065,701. An adhesive label can be applied to a VCR cassette. The label contains an antenna and integrated circuit that permits the exchange of data between the circuit on the label. The unit can store and transmit data but does not permit a renter to visually determine a return date.

Fabrication of flexible, electronically written display sheets are disclosed in U.S. Pat. No. 4,435,047. A first sheet has transparent ITO conductive areas and a second sheet has electrically conductive inks printed on display areas. The sheets can be glass, but in practice have been formed of Mylar polyester. A dispersion of liquid crystal material in a binder is coated on the first sheet, and the second sheet is bonded to the liquid crystal material. Electrical potential applied to opposing conductive areas operate on the liquid crystal material to expose display areas. The display uses nematic liquid crystal material which ceases to present an image when de-energized.

U.S. Pat. No. 5,437,811 discloses a light-modulating cell having a polymer dispersed chiral nematic liquid crystal. The chiral nematic liquid crystal has the property of being driven between a planar state reflecting a specific visible wavelength of light and a light scattering focal-conic state. The structure has the capacity of maintaining one of the given states in the absence of an electric field.

U.S. Pat. No. 6,201,587 discloses a videocassette having a display portion for displaying recorded contents wherein the display portion is a polymer dispersed liquid crystal film that displays visible information in response to the application of heat or an electric field and retains visible information in the absence of applied energy. The display can be repeatedly erased and rewritten.

It is desirable to have time related information related to an article or device which will be used by a user, for example, a cassette media or some rental article. Typically what happens is the renter will tell the renter verbally or provide a written paper or receipt which will specify the period of rental. This is inefficient and unreliable for the renter, who will be confused about the time period of rental.

SUMMARY OF THE INVENTION

It is an object of this invention to provide a method for permitting a user to visually inspect an article to determine the related time rental information.

It is another object of the invention to make use of an inexpensive electronically written label display.

These objects are achieved by a method of recording rewritable time related information on a label which can be provided on an article, comprising the steps of:

a) providing an electrically rewritable label which includes a plurality of rewritable segments, each such segment having a layer including a material which is effective in at least first and second optical states so that the time related information can be written, rewritten and viewed, wherein such time related information relates to usage or potential usage of the article or a device associated with the article and such time related information can be electrically changed by providing appropriate electrical fields to the material;

b) providing the label to be associated with the article; and c) electrically addressing selected segments to write or rewrite appropriate time related information.

It is a feature of the present invention that it is particularly suitable for use with rental devices such as media cassettes devices or other rental devices. The present invention is useful for users in that it provides an electronic label which provides a user with time information (such as return time) concerning the rental device.

DETAILED DESCRIPTION OF THE PREFERRED EMBODIMENT

Figure 1:
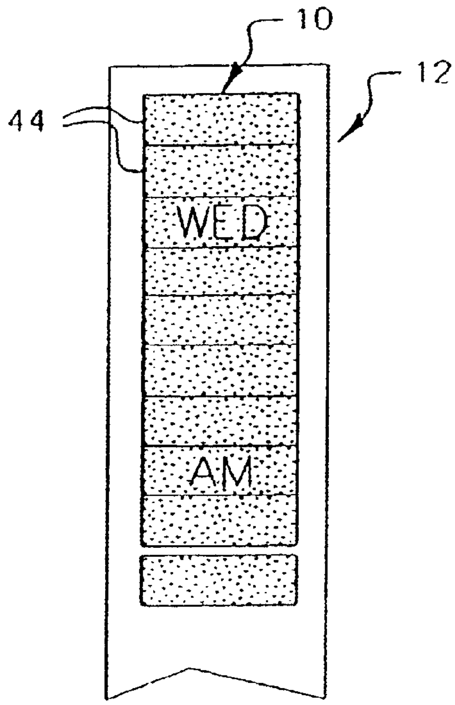
FIG. 1 is a front view of a display in accordance with the present invention.

FIG. 1 is a front view of a display 10 in accordance with the present invention attached to media cassette 12 that permits a user to conveniently view time related information concerning a rental device. The time related information will include the return time for the media cassette 12. Display 10 has a set of segments corresponding to the 7 days of the week and the abbreviation AM and PM to indicate a time of day. Display 10 is attached or fixed using adhesive to media cassette 12 and can be electronically updated using contact pads 44. The display 10 can also be formed as part of an article. Media cassette 12 is, for example, a rental unit that should be returned before the time shown on display 10. When the display is attached to the article it can be referred to as a label which has rewritable time related information that can be written, rewritten and viewed. It will be understood that the display 10, when functioning as a label, is associated with an article. For example, the display 10 can be attached to either the article which functions as a device to be used, such as media cassette 12 or some rental device or a container which contains the media cassette 12 or rental device or is associated with such a device.

Figure 2:
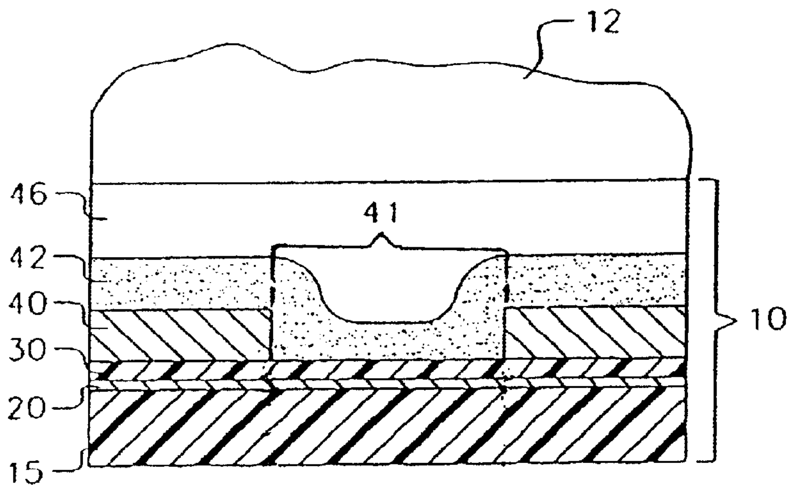
FIG. 2 is a sectional view of the display of FIG. 1.

FIG. 2 is a sectional view of display in FIG. 1. Display 10 includes a flexible substrate 15, which is a thin light-transmissive (i.e. transparent or translucent) polymeric material, such as Kodak Estar film base formed of polyester plastic that has a thickness of between 20 and 200 microns. In an exemplary embodiment, substrate 15 can be a 125-micron thick sheet of polyester film base Other polymers, such as light transmissive polycarbonate can also be used.

First transparent conductor 20 is formed over substrate 15. First transparent conductor 20 can be Tin-Oxide or Indium-Tin-Oxide (ITO), with ITO being the preferred material. Typically the ITO comprising first transparent conductor 20 is sputtered as a layer over substrate 15 to form a layer having a sheet resistance of less than 250 ohms per square. The conductor 20 forms a part of each of the segments and typically is grounded.

An optical state changing layer is formed by coating a light modulating layer 30 onto first conductor 20. In the preferred embodiment, light modulating layer 30 is a polymer dispersed cholesteric liquid crystal. Cholesteric materials can be created that have peak reflectance from the infrared through the visible spectrum by varying the concentration of chiral dopant in a nematic liquid crystal. Application of electrical fields of various intensities and duration can drive a cholesteric material (also known as chiral nematic material) into a reflective state, a transmissive state or an intermediate state. These materials have the advantage of maintaining a given state indefinitely after the field is removed. Such materials can be cholesteric liquid crystal materials can be Merck BL112, BL118 or BL126, available from EM Industries of Hawthorne, N.Y. Therefore in accordance with the invention, the material (which can be cholesteric liquid crystal) is effective in at least first and second optical states so that the time related information can be written and viewed. The time related information relates to usage or potential usage of the article or a device associated with the article and such time related information can be electrically changed by providing appropriate electrical fields to the material.

Figure 3:
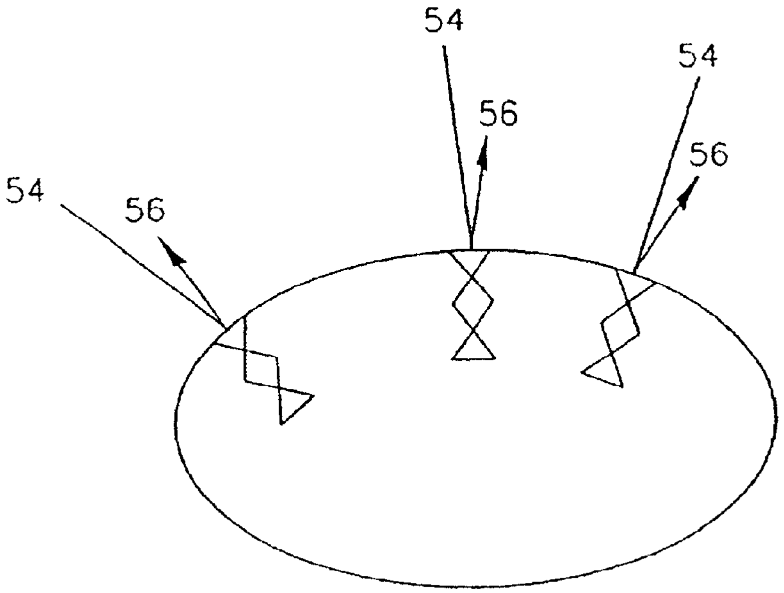
FIG. 3 is a sectional view of a domain of cholesteric liquid crystal in a polymer matrix.

In an exemplary embodiment, light modulating layer 30 is a dried emulsion of cholesteric liquid crystal material dispersed in de-ionized photographic gelatin. The liquid crystal material is dispersed at 8% concentration in a 5% de-ionized gelatin aqueous solution. It has been found that 10-micron diameter domains of the cholesteric liquid crystal in aqueous suspension optimize the electro-optical properties of the cholesteric materials. FIG. 3 is a sectional view through a polymer dispersed cholesteric domain showing that portions of incident light 54 at a given wavelength will become reflected light 56. The encapsulation process provides a pressure resistant material that improves the viewing angle of the cholesteric liquid crystal. The first surface of light modulating layer 30 is coated over first transparent conductor 20 and dried to ambient humidity to provide a 10-micron thick layer of polymer dispersed cholesteric liquid crystal material. Other organic binders such as polyvinyl alcohol (PVA) or polyethylene oxide (PEO) can be used as the polymeric agent. Such compounds are can be coated and dried on equipment associated with photographic films.

Figure 4:
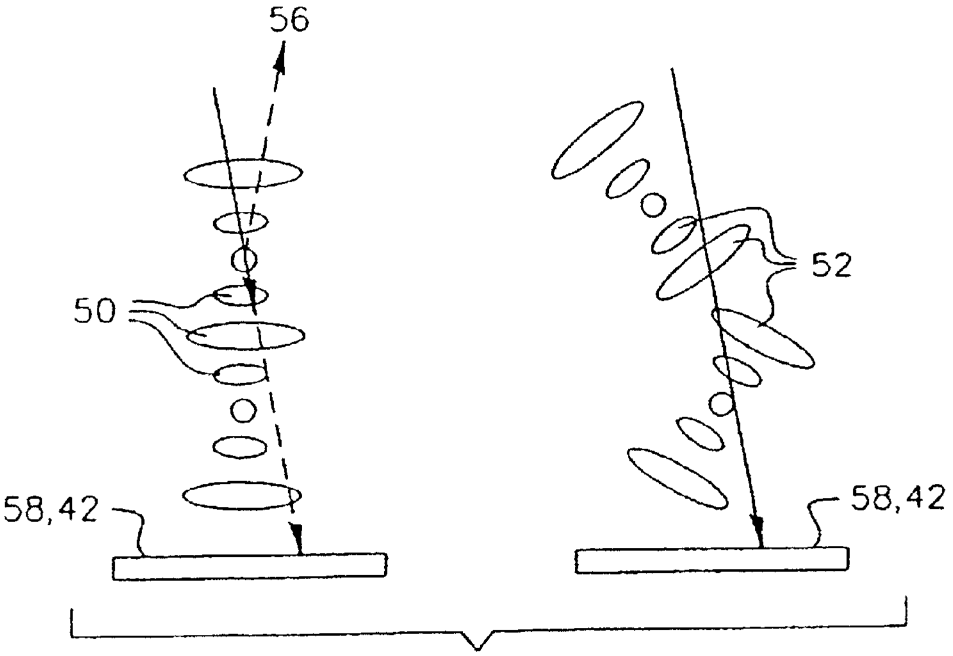
FIG. 4 is a view of the optical characteristics of cholesteric liquid crystal in each of two stable states.

FIG. 4 shows two stable states of cholesteric liquid crystals. On the left, a high planar voltage V2 been applied and quickly switched to zero potential, which applies and electric field that converts cholesteric liquid crystal to planar liquid crystal 50. Portions of incident light 54 striking planar liquid crystal 50 becomes reflected light 56 to create a bright image. On the right, application of a lower focal-conic voltage V1 applies an electric field that converts cholesteric liquid crystal to transparent focal-conic liquid crystal 52. Incident light 54 striking focal-conic liquid crystal 52 is transmitted. A light absorber 58 will absorb incident light 54 to create a dark image in areas having focal-conic liquid crystal 52. As a result, a viewer perceives an image having bright and dark areas depending on if the cholesteric material is planar liquid crystal 50 or focal-conic liquid crystal 52, respectively. A display 10 having light modulating layer 30 needs to have one transparent conductor and one light absorbing conductor. In the first exemplary embodiment, first transparent conductor 20 is transparent ITO.

For the exemplary embodiment, assume the display 10 requires 10 volts per micron thickness to convert the cholesteric material into the planar state. For an 8 micron layer, planar voltage V2 should be an 80 volt pulse for approximately 20 milliseconds converts cholesteric liquid crystals into the planar state. A pulse of about half the field strength, or 5 volts per micron converts the liquid crystal to the focal-conic state. If field carrying electrodes are spaced apart by a dielectric layer, then the field strength is reduced.

Returning to FIG. 2, a dielectric layer 40 is screen printed over light modulating layer 30. Dielectric layer 40 can be a 25 micron thick layer of Electrodag 25208 screen printable, UV curable dielectric coating from Acheson Corporation. The material is thermoplastic that is screen printable and hardens exposed to 0.3–0.6 joules/cm$^2$ of ultra violet radiation. A dielectric layer 40 screen printed at 25 microns thickness reduces the field strength to reduce planar pulse to less than the 5 volts per micron focal-conic field strength. Openings 41 in dielectric layer 40 define image areas, which are coincident with the openings 41. Since the image is viewed through substrate 15, the indicia are mirror-imaged.

Second conductors 42 are then printed over dielectric layer 40. Second conductors 42 can be formed of a 25 micron thick layer of Electrodag 423SS screen printable electrical conductive material from Acheson Corporation. The material is finely divided graphite particles in a thermoplastic resin. The effective sheet conductivity of a 25 micron printed layer is less than 250 ohms per square. Such a layer is light absorbing, typically having an optical density of greater than 2.0 D. The light absorbing property of the second conductor 42 is adequate to serve as light absorber 58 for the cholesteric liquid crystal material.

In each of the image areas under openings 41, second conductor 42 directly contacts light modulating layer 30. A planar voltage V2 applied between first transparent conductor 20 and second conductor 42 in an image area will have a10 volts per micron field strength and convert cholesteric liquid crystals in light modulating layer 30 to planar liquid crystals 50. Areas having a 25 micron thick dielectric layer 40 will only experience 2.8 volts per micron and cannot be switched to the planar state if a 100 volt pulse is applied between first transparent conductor 20 and second conductor 42. The display 10 is arranged so that display 10 can be viewed only through the light transmissive substrate. An adhesive 46 is applied to the back of the label, which bonds display 10 to media cassette 12.

Figure 5A:
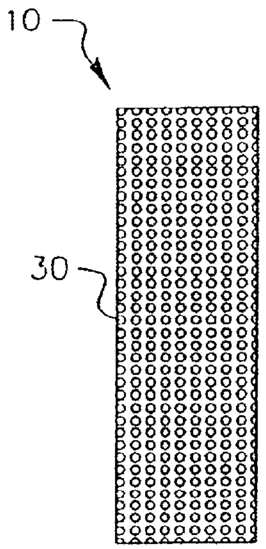
FIG. 5A is a top view of a display having a light modulating layer coated over a first transparent conductor.
Figure 5B:
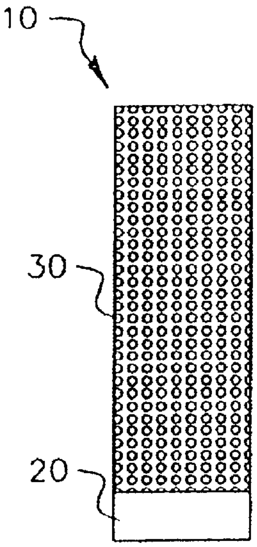
FIG. 5B is a top view of the display of FIG. 5A with a portion of the light modulating layer removed to show the first transparent conductor.
Figure 5C:
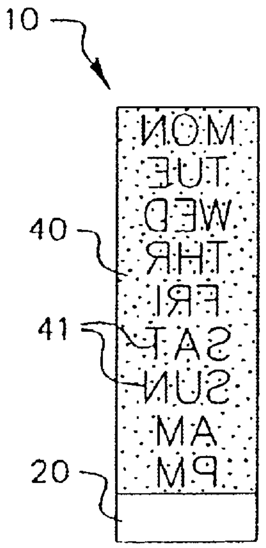
FIG. 5C is a top view of the display of FIG. 5B having a printed dielectric layer with unprinted image areas.

The process for manufacturing displays 10 is shown in FIGS. 5A–5F. FIG. 5A is a rear view of a substrate 15 supporting first transparent conductor 20 and light modulating layer 30. FIG. 5B is the structure from FIG. 5A after removal of a portion of light modulating layer 30 to reveal first transparent conductor 20. In the case of a gelatin and liquid crystal emulsion, light modulating layer 30 is removed by immersion in water and mechanical agitation. FIG. 5C is the structure of FIG. 5B after being printed with dielectric layer 40 having openings 41 defining image areas. Openings 41 in dielectric layer 40 expose areas of first transparent conductor 20.

Figure 5D:
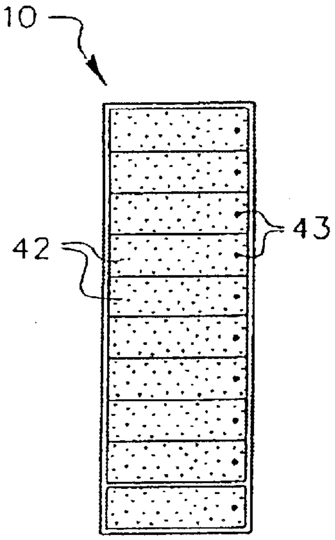
FIG. 5D is a top view of the display of FIG. 5C having second conductors printed over the dielectric layer.
Figure 5E:
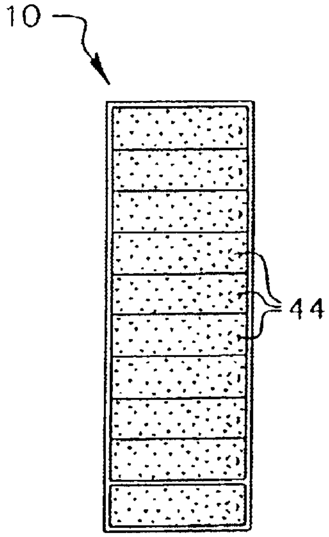
FIG. 5E is a top view of the display of FIG. 5D with contacts attached to each second conductor.
Figure 5F:
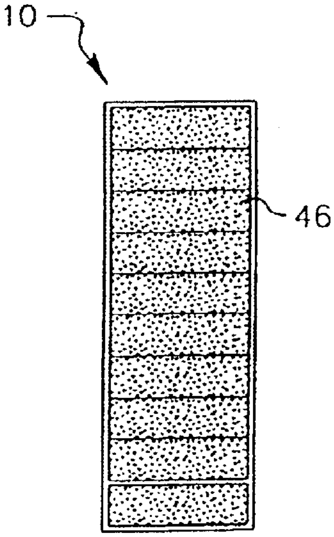
FIG. 5F is a top view of the display of FIG. 5E and having an applied adhesive coating.

FIG. 5D is the structure of FIG. 5C having a second conductor 42 printed over each indicia of display 10. Through holes 43 are perforated through the entire structure outside of the indicia but through each second conductor 42. FIG. 5E is the display 10 of FIG. 5D, after application of thin, metallic contact pads 44. Contact pads 44 can be 25 micron gold plated copper sheets having a conductive adhesive that bonds each contact pad 44 over each through hole 43. FIG. 5F is the display 10 of FIG. 5E further including an adhesive 46, such as a contact adhesive, coated over the display 10. The completed display 10 of FIG. 5F can be attached to an A/V cassette. The top nine contacts of the display correspond to the 7 days of the week and the morning and evening portions of each day. The bottom contact pad 44 provides an electrical ground to first transparent conductor 20.

Figure 6A:
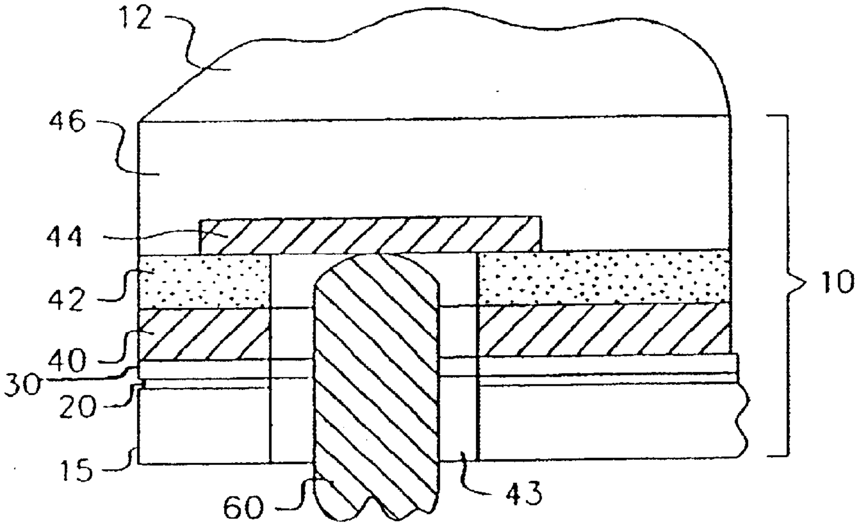
FIG. 6A is a sectional view of a contact connecting to a second conductor forming an image.
Figure 6B:
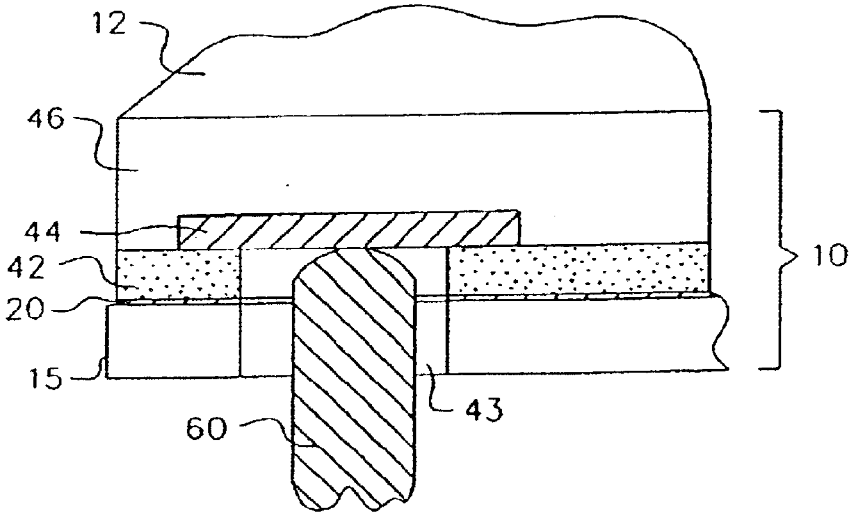
FIG. 6B is a sectional view of a contact connecting to a second conductor providing ground potential to the first transparent conductor.

FIG. 6A is a sectional view of display 10 showing electrical interconnect detail for the indicia. Contact 60 passes through hole 43 and engages contact pad 44. A contact pad 44 is bonded to each second conductor 42 for each indicia. FIG. 6B is a sectional view of the electrical interconnection to first transparent conductor 20. Contact 60 passes through hole 43 to connect with contact pad 44. Because dielectric layer 40 is not printed in the area and light modulating layer 30 has been removed, contact pad 44 is connected to first transparent conductor 20 to provide a ground field under each indicia.

Figure 7:
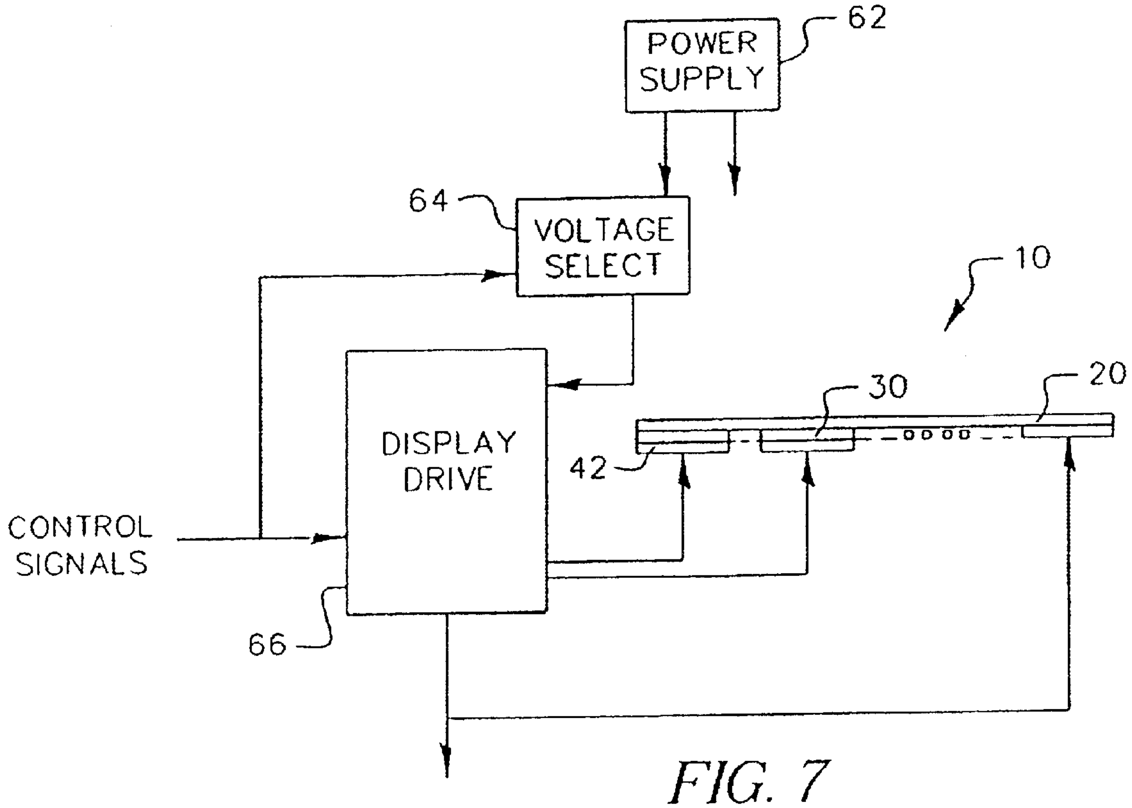
FIG. 7 is an electrical schematic of circuitry to write and rewrite time related information to display 10.

FIG. 7 is an electrical schematic of the circuitry used to write display 10. Contacts 60 pass through holes 43 to engage contact pads 44 as shown in FIGS. 6A and 6B. In FIG. 7, contact is made to the right most segment and connects first transparent conductor 20 to ground. The other segments are electrically connected to display drive 66. Power supply 62 generates two voltages, a first planar driving voltage and a second focal-conic voltage. A voltage select circuit 64 is used to select one of the two voltages. Voltage select circuit 64 can be as simple as a resistor network and a switching transistor. Control signals are applied to the voltage select circuit 64 and also to display drive 66. Display drive 66 is used to apply the selected voltage to appropriate segments of the display 10. In this way, the circuitry selectively addresses the different segment to cause them to be in an appropriate optical state for viewing or rewriting. Display drive 66 operates on a selected voltage from voltage selector 64 and applies either a ground or selected voltage to contacts 60. Display drive 66 can for example be embodied in a commercially available device known as HV57908PG from Supertex, Inc. of Sunnyvale, Calif.

Figure 8:
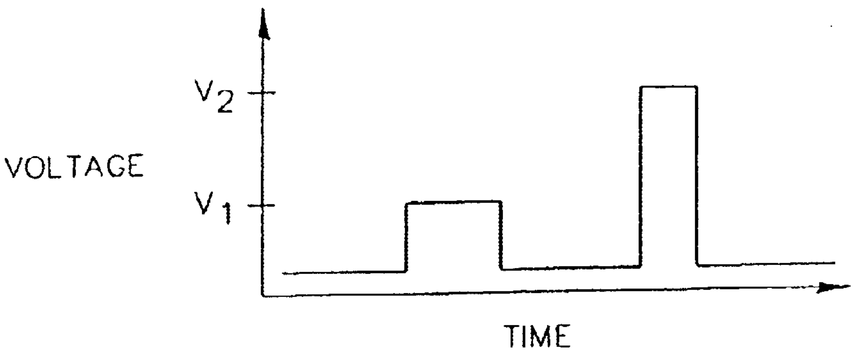
FIG. 8 is an electrical waveform used to erase and rewrite to display 10.

FIG. 8 is a diagram of the voltage waveform applied by display drive 66 to drive display 10. Voltage select circuit 64 is first set to the lower, focal-conic voltage V1 and all contacts 60 connected to second conductor 42 receive a pulse of focal-conic voltage V1 to clear any reflective image from display 10. Voltage select circuit 64 is then set to apply a higher planar voltage V2 to display drive 66. Display drive 66 is then switched to apply planar voltage V2 across selected segments that are to be placed in the reflective, planar state. Those segments that are to remain non-reflective are not switched. The waveform shows the sequence of voltages that are used to write indicia into the planar state. Planar voltage V2 is omitted to maintain indicia in the clear focal-conic state. The drive method is a simple method of erasing and re-writing display 10.

The invention discloses an arrangement to use re-writable attachable time labels for rental devices such as audio-visual recording cassettes. The invention has been described in detail with particular reference to certain preferred embodiments thereof, but it will be understood that variations and modifications can be effected within the spirit and scope of the invention.

PARTS LIST

| | |
|---|---|
| 10 | display |
| 12 | media cassette |
| 15 | substrate |
| 20 | first transparent conductor |
| 30 | light modulating layer |
| 40 | dielectric layer |
| 41 | openings |
| 42 | second conductors |
| 43 | through holes |
| 44 | contact pads |
| 46 | adhesive |
| 50 | planar liquid crystals |
| 52 | focal-conic liquid crystals |
| 54 | incident light |
| 56 | reflected light |
| 58 | light absorber |
| 60 | contacts |
| 62 | power supply |
| 64 | voltage select circuit |
| 66 | display drive |

What is claimed is:

1. A method of recording rewritable time related information on a label which can be provided on an article, comprising the steps of:

a) providing an electrically rewritable label which includes a plurality of rewritable segments, each such segment having a layer including a material which is effective in at least first and second optical states so that the time related information can be written, rewritten and viewed, wherein such time related information relates to usage or potential usage of the article or a device associated with the article and such time related information can be electrically changed by providing appropriate electrical fields to the material, wherein each segment corresponds to a day of the week or a time of day;

b) providing the label to be associated with the article; and c) electrically addressing selected segments to write or rewrite appropriate time related information.

2. A method of recording rewritable time related information on a label which can be provided on an article, comprising the steps of:

a) providing an electrically rewritable label which includes a plurality of rewritable segments, each such segment having a layer including cholesteric liquid crystal material which is effective in at least first and second optical states so that the time related information can be written, rewritten and viewed, wherein such time related information relates to usage or potential usage of the article and such time related information can be electrically changed by providing appropriate electrical fields to the material, wherein each segment corresponds to a day of the week or a time of day;

b) providing the label to be associated with the article; and c) electrically addressing selected segments to write or rewrite appropriate time related information.

3. A method of recording rewritable time related information on a label which can be provided on a rental article, comprising the steps of:

a) providing an electrically rewritable label which includes a plurality of rewritable segments, each such segment having a layer of a material which is effective in at least first and second optical states so that the return time related information can be written and viewed, wherein such return time related information relates to usage or potential usage of the article and such return time related information can be electrically changed by providing appropriate electrical fields to the material, wherein each segment corresponds to a day of the week or a time of day;

b) providing the label to be associated with the article; and c) electrically addressing selected segments to write or rewrite appropriate time related information.

4. The method of claim 3 wherein the material includes cholesteric liquid crystal.

5. The method of claim 3 wherein the rental article is a media cassette.

6. A method of recording rewritable time related information on a label which can be provided on a rental article, comprising the steps of:

a) providing an electrically rewritable label which includes a plurality of rewritable segments, each such segment having a light transmissive substrate; a transparent conductor over such substrate; a layer including cholesteric liquid crystal material over the transparent conductor; a patterned dielectric layer over the layer including cholesteric liquid crystal material, wherein the dielectric layer has openings therethrough to the layer including cholesteric liquid crystal material; and a second conductor provided over the dielectric layer and in the openings to be in contact with the layer including the cholesteric liquid crystal material, wherein the cholesteric liquid crystal material in contact with the second conductor is effective to be in at least first and second optical states so that the time related information can be written and viewed, wherein such time related information relates to usage or potential usage of the article and such time related information can be electrically changed by providing appropriate electrical fields to the material;

b) providing the label to be associated with the article; and c) electrically addressing selected segments to erase undesired previous time related information and writing appropriate time related information.

7. An article having a display portion for displaying time related information, wherein the display portion is an electrically rewritable cholesteric liquid crystal display that maintains the time related information in the absence of an electric field, and wherein the rewritable display is segmented, each segment corresponding to a day of the week or a time of day.

8. The article claimed in claim 7, wherein the cholesteric liquid crystal display comprises a polymer dispersed liquid crystal film.

9. The article claimed in claim 8, wherein the polymer dispersed liquid crystal film is a dried gelatin-cholesteric liquid crystal emulsion.

10. The article claimed in claim 7, wherein the article is a rented video recording, and the time related information is the return time when the recording is due to be returned to a rental agency.

11. The article claimed in claim 10, wherein the display is adapted to selectively display the days of the week and AM and PM.

12. The article claimed in claim 7, wherein the display comprises:

a flexible support;

a transparent conductor on the flexible support;

a film comprising a dried emulsion of cholesteric liquid crystal in gelatin located over the transparent conductor on the support;

a patterned dielectric layer located over the liquid crystal film, openings in the pattern defining image areas;

a set of conductors located over the dielectric layer, the conductors making contact with the liquid crystal film through the openings; and a set of contacts for making electrical contact with the transparent conductor and the conductors of the set of conductors, respectively.

13. A system for renting an article, comprising:

a) a label affixed to the article including an electrically rewritable cholesteric liquid crystal display for displaying time related information related to the usage of the article, wherein the rewritable display is segmented, each segment corresponding to a day of the week or a time of day; and b) apparatus for electrically writing the time related information on the display device.

14. The system claimed in claim 13, wherein display comprises a polymer dispersed liquid crystal film.

15. The system claimed in claim 13, wherein the article is a rented video recording, and the time related information is the return time when the recording is due to be returned to a rental agency.

16. The system claimed in claim 15, wherein the display is adapted to selectively display the days of the week and AM and PM.

17. The system claimed in claim 13, wherein the polymer dispersed liquid crystal film is a dried gelatin-cholesteric liquid crystal emulsion.

18. The system claimed in claim 13, wherein the display comprises:

a flexible light transmissive support;

a transparent conductor on the flexible support;

a film comprising a dried emulsion of cholesteric liquid crystal in gelatin located over the transparent conductor on the support;

a patterned dielectric layer located over the liquid crystal film, openings in the pattern defining image areas;

a set of conductors located over the dielectric layer, the conductors making contact with the liquid crystal film through the openings; and a set of contacts for making electrical contact with the transparent conductor and the conductors of the set of conductors, respectively.

19. A method of renting an article, comprising the steps of:

a) providing a label including an electrically rewritable cholesteric liquid crystal display for displaying time related information related to the usage of the article, wherein the rewritable display is segmented, each segment corresponding to a day of the week or a time of day;

b) affixing the label to the article;

c) electrically writing time related information related to the usage of the article on the display; and d) delivering the article to a renter.

20. The method claimed in claim 19, wherein display comprises a polymer dispersed liquid crystal film.

21. The method claimed in claim 19, wherein the article is a rented video recording, and the time related information is the return time when the recording is due to be returned to a rental agency.

22. The method claimed in claim 21, wherein the display is adapted to selectively display the days of the week and AM and PM.

23. The method claimed in claim 19, further comprising the steps of:

e) returning the article to a rental agency; and d) rewriting time related information related to a subsequent use of the article.

24. The method claimed in claim 19, wherein the polymer dispersed liquid crystal film is a dried gelatin-cholesteric liquid crystal emulsion.

25. The method claimed in claim 19, wherein the display comprises:

a flexible light transmissive support;

a transparent conductor on the flexible support;

a film comprising a dried emulsion of cholesteric liquid crystal in gelatin located over the transparent conductor on the support;

a patterned dielectric layer located over the liquid crystal film, openings in the pattern defining image areas;

a set of conductors located over the dielectric layer, the conductors making contact with the liquid crystal film through the openings; and a set of contacts for making electrical contact with the transparent conductor and the conductors of the set of conductors, respectively.

26. An article having a display portion for displaying time related information, wherein the display portion is an electrically rewritable cholesteric liquid crystal display that maintains the time related information in the absence of an electric field, the display portion comprising:

a flexible support;

a transparent conductor on the flexible support;

a film comprising a dried emulsion of cholesteric liquid crystal in gelatin located over the transparent conductor on the support;

a patterned dielectric layer located over the liquid crystal film, openings in the pattern defining image areas;

a set of conductors located over the dielectric layer, the conductors making contact with the liquid crystal film through the openings; and a set of contacts for making electrical contact with the transparent conductor and the conductors of the set of conductors, respectively.

27. A system for renting an article, comprising:

a) a label affixed to the article including an electrically rewritable cholesteric liquid crystal display for displaying time related information related to the usage of the article; and b) apparatus for electrically writing the time related information on the display device, wherein the display comprises:

a flexible support;

a transparent conductor on the flexible support;

a film comprising a dried emulsion of cholesteric liquid crystal in gelatin located over the transparent conductor on the support;

a patterned dielectric layer located over the liquid crystal film, openings in the pattern defining image areas;

a set of conductors located over the dielectric layer, the conductors making contact with the liquid crystal film through the openings; and a set of contacts for making electrical contact with the transparent conductor and the conductors of the set of conductors, respectively.

28. A method of renting an article, comprising:

a) providing a label including an electrically rewritable cholesteric liquid crystal display for displaying time related information related to the usage of the article;

b) affixing the label to the article;

c) electrically writing time related information related to the usage of the article on the display; and d) delivering the article to a renter, wherein the display comprises:

a flexible support;

a transparent conductor on the flexible support;

a film comprising a dried emulsion of cholesteric liquid crystal in gelatin located over the transparent conductor on the support;

a patterned dielectric layer located over the liquid crystal film, openings in the pattern defining image areas;

a set of conductors located over the dielectric layer, the conductors making contact with the liquid crystal film through the openings; and a set of contacts for making electrical contact with the transparent conductor and the conductors of the set of conductors, respectively.

* * * * *